United States Patent [19]

Moran

[11] Patent Number: 5,325,971

[45] Date of Patent: Jul. 5, 1994

[54] METHOD AND RECEPTACLE FOR FILTERING LAWN AND GARDEN DEBRIS

[76] Inventor: Sharon B. Moran, 7040 W. Gardiner St., Milton, Fla. 32583

[21] Appl. No.: 106,554

[22] Filed: Aug. 16, 1993

[51] Int. Cl.⁵ .................................................. B07B 1/49
[52] U.S. Cl. ................................. 209/417; 209/614; 209/235
[58] Field of Search .............. 209/614, 235, 281, 352, 209/417–420, 930

[56] References Cited

U.S. PATENT DOCUMENTS

| | | | |
|---|---|---|---|
| 375,787 | 1/1888 | Wilkin | 209/420 X |
| 393,295 | 11/1888 | Carrico | 209/420 X |
| 500,542 | 6/1893 | Whitney | 209/419 |
| 973,895 | 10/1910 | Tress | 209/352 X |
| 3,979,146 | 9/1976 | Berg | 209/418 |
| 4,162,967 | 7/1979 | Gironda, Jr. | 209/235 |
| 4,350,584 | 9/1982 | Donington | 209/420 X |
| 4,828,690 | 5/1989 | Montez | 209/418 |

Primary Examiner—D. Glenn Dayoan
Attorney, Agent, or Firm—George A. Bode; Michael L. Hoelter

[57] ABSTRACT

A cart that is useful to contain, store and/or transport lawn and/or garden debris and filter or screen this debris into different size classifications.

8 Claims, 2 Drawing Sheets

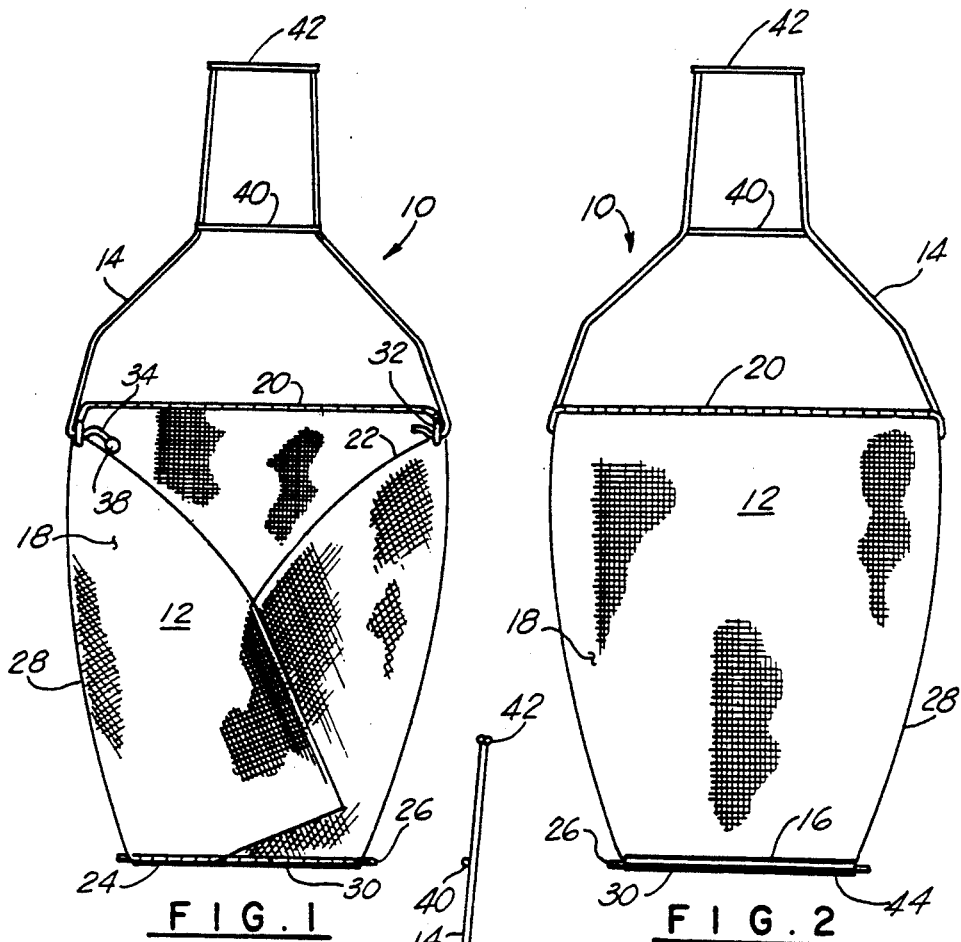
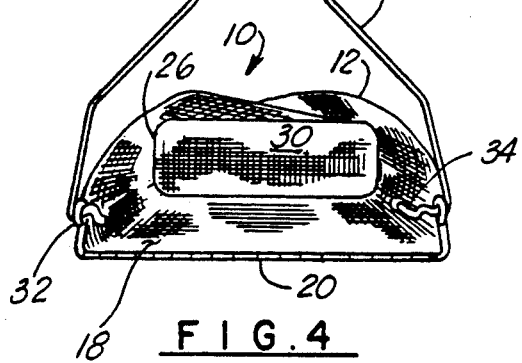
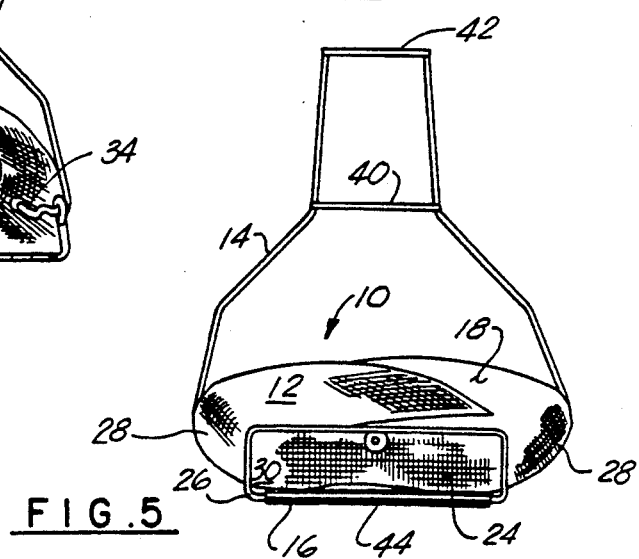

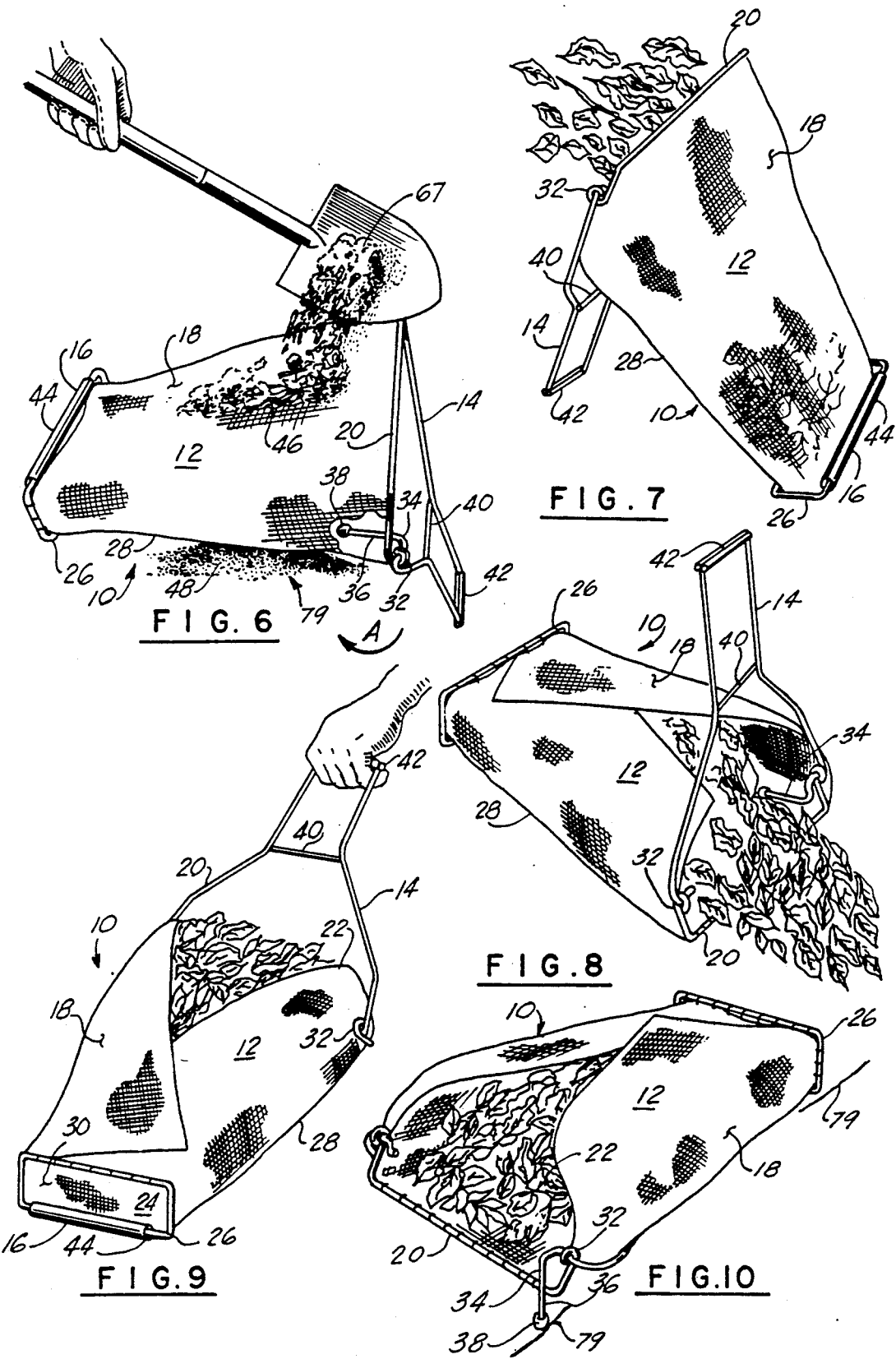

METHOD AND RECEPTACLE FOR FILTERING LAWN AND GARDEN DEBRIS

BACKGROUND OF THE INVENTION

1. Field of the Invention

This invention pertains to gardening implements and more particularly to a multi-use receptacle for hauling, storing, and filtering purposes.

2. General Background

Many different devices exist which aid the user in gathering yard trash such as sticks, leaves, and twigs. Some of the more simple devices merely hold a collection receptacle or a garbage bag open so that the debris can be inserted therein. Others provide a wheeled cart that can be used to haul the collected debris around.

Some examples of the prior devices include U.S. Pat. No. 3,747,653 issued to Ringer and U.S. Pat. No. 4,805,858 issued to Taylor. The '653 patent issued to Ringer consists of a wire hoop secured around the opening of a bag so as to keep it open. An elongated rod is secured to the wire hoop to help retain the wire hoop in a vertical position during use. This rod extends along the length of the bag thereby partially collapsing it during use. Also, the rod extends along the direct flow path of the collected debris, thereby acting as an obstacle during use.

The '858 patent issued to Taylor pertains to a rigid frame around which the opening of a garbage bag is secured. This rigid frame is then staked into the ground so as to retain it in an upright position. Unfortunately, if the ground is wet or loose, the stake will not hold very well, thereby allowing the frame, and hence the opening of the bag, to collapse. Also, if the ground is hard or a rock or other obstruction is hit, the frame will not be properly secured, thereby also diminishing its effectiveness such as by permitting a gap to occur between the bag opening and the ground.

Some typical examples of the wheeled cart variety referred to above include U.S. Pat. No. 2,992,011 issued to Becan, U.S. Pat. No. 4,202,521 issued to Harding, and U.S. Pat. No. 5,040,754 issued to Dearman. The '011 patent issued to Becan pertains to a foldable wheeled cart with lid. During use, one side of the cart is placed upon the ground with the lid unfolded outwardly. The leaves or other debris are then moved onto the lid and into the cart. When full, the lid is closed and the cart pivoted on its wheels, thereby enabling the user to transport the debris as desired.

The '521 patent issued to Harding and the '754 patent issued to Dearman, both pertain to a combination bag holder and dolly that supports the bag in an upright open position during use (the '754 patent issued to Dearman can also function in a horizontal position). Trash and/or debris is deposited into the bag which is then transported elsewhere for disposal. The '521 patent issued to Harding further features a quick on/off mechanism which aids in the removal and/or replacement of the bag upon the cart. The '754 patent issued to Dearman features a pivotable ramp that aids in pushing or scooping the debris into the bag.

U.S. Pat. Nos. 3,782,752 to Gobetz, No. 2,757,935 to Sofia and No. 3,927,894 to Zawislak teach wheeled receptacles.

While each of these examples may function quite well for their particular intended purpose, they all have deficiencies of one type or another and they are not so suited for other tasks that a gardener may desire or require. It is thus an object of this invention to provide a portable gardening cart that can collect, store, and transport garden debris.

It is another object of this invention to provide a filtering system for filtering garden soil so as to remove any unwanted objects therefrom.

Yet another object of this invention is to provide an adjustable filtering system such that different levels or gradations of filtration can be accomplished such that the size of the object to be discarded and the size of the material to be retained can be adjusted as needed. Other objects and advantages of this invention can be ascertained from further investigation herein.

SUMMARY OF THE PRESENT INVENTION

The preferred embodiment of the apparatus of the present invention solves the aforementioned problems in a straightforward and simple manner. What is disclosed is a receptacle for lawn debris that is configured with basket means for containing lawn or garden debris therein. This basket means has an open top and a closed bottom and also is configured with screening or filtering means for screening or filtering lawn or garden debris deposited thereon. Handle means are secured to the basket means adjacent the open top for both grasping the basket means and for supporting the basket means in a variety of inclined positions. These handle means are pivotable with respect to the basket means and include a stop for inclining the basket means in a selected or pre-determined position with respect to the ground. Wheel means are secured to the basket means adjacent the closed bottom for transporting the basket means as needed.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 1 is a top plan view of the multi-use lawn and/or garden cart with the handle extending outward therefrom;

FIG. 2 is a bottom plan view of the embodiment of FIG. 1 with the handle extending outwardly therefrom;

FIG. 3 is a left side elevational view of the embodiment of FIG. 1 with the handle extending generally perpendicular to the length of the cart;

FIG. 4 is a front elevational view of the embodiment of FIG. 1 with the handle extending generally perpendicular to the length of the cart;

FIG. 5 is a rear elevational view of the embodiment of FIG. 1 with the handle extending generally perpendicular to the length of the cart;

FIG. 6 is a bottom and left side pictorial view of the embodiment of FIG. 1 illustrating its use to sift dirt;

FIG. 7 is a bottom and right side pictorial view of the embodiment of FIG. 1 illustrating one manner of its use to collect lawn and/or garden debris;

FIG. 8 is a top, front and right side pictorial view of the embodiment of FIG. 1 illustrating an alternate manner of its use to collect lawn and/or garden debris;

FIG. 9 is a top, rear and left side pictorial view of the embodiment of FIG. 1 illustrating its use to retain and transport lawn and/or garden debris; and, FIG. 10 is a top, front and left side pictorial view of the embodiment of FIG. 1 illustrating its use to retain lawn and/or garden debris.

DETAILED DESCRIPTION OF THE PREFERRED EMBODIMENT

Referring initially to FIGS. 1-5, there is shown multi-use lawn and/or garden cart 10 which comprises basket 12, handle 14, and wheel assembly 16. As shown, handle 14 is pivotable with respect to basket 12 for ease in moving cart 10 via wheel assembly 16.

Basket 12 generally consists of an equally sized open mesh material or screen 18, such as wire mesh, whose openings are about one quarter inch square, more or less. The material of screen 18 is sufficiently rigid so as to retain the shape of basket 12 without any collapsing or buckling. Screen 18 is also rigid enough to support the contents of basket 12 when cart 10 is in an upright or inclined position. To retain screen 18 in place, a wire rod or the like 20 may be secured around the perimeter or edges of basket 12.

One end, end 22, of basket 12 is open as shown while the opposite end, end 24, is closed. In this manner, lawn and/or garden debris may be deposited within cart 10 and will be retained within such cart 10 as needed. While the FIGURES illustrate an overlapping of screen 18 to create open end 22, other configurations of basket 12 are equally suitable.

Closed end 24 is illustrated as having a rectangular wire frame 26 around its perimeter to provide both support and rigidity. This wire frame 26 is secured between the sides 28 of basket 12 and the bottom 30 of basket 12. Other configurations of closed end 24 are also equally likely. Furthermore, basket 12 may be tapered or curved inward towards bottom 30 as shown or basket 12 may contain parallel sides 28. It is even conceivable for basket 12 to have sides which flair, taper, or curve outwardly toward bottom 30.

Handle 14 is generally secured to wire rod 20 adjacent open end 22, however, handle 14 may be otherwise connected to basket 12 as desired. In this embodiment, handle 14 is shown as also consisting of a bent wire rod 20, however other configurations or other material may be equally suitable for handle 14.

The connector 32 between handle 14 and wire rod 20 is such that handle 14 is pivotally secured thereto so as to enable handle 14 to pivot as needed to a variety of positions during use. Consequently, handle 14 may be pivoted so as to enable basket 12 to lie flat on the ground or at least generally parallel thereto (FIGS. 8 and 10). Handle 14 may also be pivoted so as to support basket 12 in a range of selected inclined positions (FIGS. 6 and 7). Handle 14 may also be pivoted so as to ease the transport of the garden debris contained within basket 12 (FIG. 9).

A stop 34 is secured to handle 14 so as to support basket 12 slightly up off the ground if such is needed (FIG. 10) or stop 34 can be pivoted so as to enable basket to lie flat against the ground (FIG. 8). Stop 34 can also be positioned so as to retain basket 12 in an inclined position by preventing any further movement of handle 12 (in the direction of ARROW A in FIG. 6).

Generally, stop 34 consists of a wire rod extension 36 of handle 14 with an enlarged end 38. This enlarged end 38 acts both as a safety feature so that this rod extension 36 does not cause any injury and it aids in retaining handle 14 in the desired position. For example, in FIG. 6, enlarged end 38 retains handle 14 in place so as to cause basket 12 to be supported in an inclined position. In FIG. 10, enlarged end 38 prevents stop 34 from further penetrating the ground 79, thereby holding basket 12 slightly above the ground. Stop 34 operates by causing enlarged end 38 to engage screen material 18, thereby preventing any further movement of handle 14 (FIG. 6). Stop 34 also operates by causing rod extension 36 to engage wire frame 20 as shown in FIG. 10.

Attached intermediate handle 14 is horizontal brace member 40 which adds strength and rigidity to handle 14. If desired, more such braces 40 can be added to handle 14 or handle 14 can be configured without any such braces 40.

To ease use of cart 10, a comfortable grip 42 is secured to handle 14 so that when cart 10 is being transported as best shown in FIG. 9, the user need not be directly gripping the wire rod. Grip 40 may be of soft pliable material or grip 40 may consist of a harder substance. Additionally, grip 40 may freely rotate about the wire frame or grip 40 may be more securely attached to handle 14. In any event, grip 40 is configured to provide a more comfortable means of transporting cart 10.

Wheel assembly 16 as shown in the drawing figures consists of a length of tubular material 44 positioned loosely around a portion of wire frame 26. In this fashion, tubular material 44 will rotate along the ground as cart 10 is moved. Other configurations of wheel assembly 16 are equally likely, including having an axis that is secured to basket 12 with separate conventional wheels at each end thereof.

Cart 10 is useful in not only transporting lawn and/or garden debris as needed, but due to open mesh or screen 18 in conjunction with pivotable handle 14, cart 10 can also function as a filter or screen to separate soil into different size classifications or grades. This feature is better illustrated in FIG. 6 wherein a shovel-full of dirt 67 is placed upon the bottom of basket 12. In this fashion, the size of the material passing through basket 12 is adjustable depending upon the angle cart 10 assumes with respect to the ground 79. Consequently, larger particles or organic matter 46 will not pass through basket 12 and instead will slid off one side or the other 28 of basket 12 while the desired particle sizes 48 will pass through basket 12 and collect directly underneath it on the ground 79. By pivoting handle 14 (in the direction of and opposite ARROW A) so as to adjust the incline of basket 14, smaller or larger particles will be permitted to pass through basket 14 as needed. Handle 14 can be pivoted in order to incline basket 12 at any position between a generally horizontal position (of FIGS. 1 and 2) to a generally vertical position (of FIG. 3).

For example, by positioning basket 12 in a nearly upright manner (as in FIG. 7) by the use of handle 14, the effective openings of screen 18 are made small such that only the smallest particles of the dirt or other debris falling vertically onto screen 18 will pass therethrough. The larger particles will slide down along the outside of basket 12 and collect near closed end 24. As the incline of basket 12 is adjusted and as basket 12 is moved into a more parallel position with respect to the ground (as seen in FIG. 6), the effective openings of screen 18 will increase, thereby permitting larger and larger particles to pass therethrough. When basket 12 is lying directly upon the ground (FIG. 3) and is no longer being supported by handle 14, the size of open mesh or screen 18 will be the largest size permitted to pass therethrough, anything larger will slide off sides 28 of basket 12. In this fashion, any non-composted or larger matter will be separated out from the desired composted material which can now be used in the garden or on the lawn.

Additionally, if it is desired to initially collect leaves or other lawn and/or garden debris in cart 10 and retain them therein, it is now possible to shake or otherwise agitate cart 10 at a later date such that only material sized equal to or smaller than the openings of screen 18 will pass therethrough. Thus, while new matter can consistently be added to cart 10, material of a generally uniform size can also consistently be removed from cart 10. Thus, a continuous cycle can be generated whereby older composted material is removed from cart 10 while new non-composted material can be added to cart 10. The openings in cart 10 also aid in the aeration of the material contained within cart 10.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A receptacle for lawn and garden debris comprising:
   (a) basket means for containing said debris therein, said basket means having an open top and a closed bottom, and, comprised of a generally rigid equally sized open mesh material for screening or filtering said debris deposited thereon, said closed bottom comprising a wire frame around its perimeter for support and rigidity;
   (b) handle means comprising a bent wire rod secured to said basket means adjacent said open top for grasping said basket means and for supporting said basket means in a range of selected inclined positions, said handle means being pivotable with respect to said basket means and further comprising a stop for inclining said basket means in a selected position with respect to the ground; and,
   (c) wheel means secured to said basket means adjacent said closed bottom for transporting said basket means.

2. The receptacle as set forth in claim 1 wherein said wheel means comprises a rotatable tubular material mounted around a portion of said wire frames.

3. The receptacle as set forth in claim 2 wherein said stop engages said open mesh material for inclining said basket means in a selected position with respect to the ground.

4. The receptacle as set forth in claim 3 wherein said handle means are adjustable so as to permit said basket means to be inclined at any position from a generally horizontal position to a generally vertical position with respect to the ground.

5. A method of filtering or screening garden and lawn debris comprising the steps of:
   (a) inclining basket means with respect to the ground, said basket means being configured to contain said debris therein, and, having an open top and a closed bottom, said basket means being comprised of a generally rigid equally sized open mesh material and said closed bottom comprising a wire frame extending around its perimeter for support and rigidity;
   (b) securing handle means comprising a bent wire rod to said basket means adjacent said open top for grasping said basket means and for supporting said basket means in a range of inclined positions, said handle means being pivotable with respect to said basket means and comprising a stop for inclining said basket means in a selected position with respect to the ground;
   (c) securing wheel means to said basket means adjacent said closed bottom for transporting said basket means; and,
   (d) screening or filtering said debris deposited upon said basket means when said basket means is supported in a selected inclined position with respect to the ground.

6. The method as set forth in claim 5, wherein a rotatable tubular material is mounted around a portion of said wire frame.

7. The method as set forth in claim 6 further comprising the step of engaging said stop with said open mesh material for inclining said basket means in selected positions with respect to the ground.

8. The method as set forth in claim 7 further comprising the step of adjusting said handle means so as to permit said basket means to be inclined at a selected position between a generally horizontal position to a generally vertical position with respect to the ground.

* * * * *